2,959,597

VINYL CHLORIDE-CYCLIC ETHER GRIGNARD REAGENTS

Hugh E. Ramsden, Scotch Plains, and Allen E. Balint, Woodbridge, N.J., assignors to Metal & Thermit Corporation, Woodbridge Township, Middlesex County, N.J., a corporation of New Jersey No Drawing. Filed Nov. 22, 1957, Ser. No. 698,073

18 Claims. (Cl. 260—345.1)

This application is a continuation-in-part of our copending application, Serial No. 549,517, filed November 28, 1955, which is in turn a continuation-in-part of our earlier applications, Serial Nos. 413,441 and 413,442, both filed March 1, 1954, now abandoned.

The present invention relates to new and useful products, vinylic magnesium chloride complexes, and to the method of preparing said products. These vinylic magnesium chloride complexes are of great value as synthetic intermediates and undergo most of the characteristic reactions of Grignard reagents.

Vinylic chlorides are relatively inert to magnesium and hitherto it has not been practical to form vinylic magnesium chloride complexes by means of the usual Grignard reaction. In order to obtain vinylic magnesium derivatives it has generally been necessary to use vinylic bromide or vinylic iodide. This results in a considerable increase in the cost of preparation of the desired vinylic magnesium compound.

The object of the present invention is to obtain vinylic magnesium chloride complexes which may be prepared inexpensively from relatively easily available vinylic chlorides.

It is also an object of the present invention to provide an inexpensive method for preparing vinylic magnesium chloride complexes from easily available vinylic chlorides.

Other and more detailed objects will be apparent from the following description and claims.

The term "vinylic" in the present application includes not only the vinyl group $CH_2=CH-$ but also the related groups in which one or more of the hydrogens have been substituted by other groups.

In accordance with the present invention it has been found that vinylic magnesium chloride complexes may be formed by reacting the vinylic chloride with magnesium in the presence of a compound Q hereinafter defined. The method of preparation consists of using the compound Q as a complexing reactant and preferably also as a solvent for the reaction in which the vinylic chloride reactant is reacted with magnesium, with or without standard activation.

The compound "Q" as used in this description and the appended claims means a cyclic ether containing 5 or 6 members in the ring with at least one hydrogen atom attached to each carbon atom in the ring and having the formula:

wherein X is a methylene group or $=NR''$ ($R''$ being an alkyl group), R is an unsubstituted saturated divalent aliphatic hydrocarbon radical, R' is an ethylene radical, an ethylenically unsaturated divalent hydrocarbon radical or $=CHR'''$ ($R'''$ being hydrogen or an aliphatic radical), and O is oxygen. When X is $=NR''$, the ring shall contain 6 members with X and O in a position 1:4 with respect to each other. Compounds within this definition include tetrahydrofuran, tetrahydropyran, 2-methyltetrahydrofuran, 2-ethoxytetrahydropyran, tetrahydrofurfuryl ethyl ether, dihydropyran and N-methylmorpholine. It is contemplated that compound Q may be substituted with groups which are not reactive with organomagnesium chlorides, or with any of the other components and products of the reaction mixtures of the present process. This includes substituted and unsubstituted alkyl, aryl, alkoxy and aryloxy groups (all allowable substitutes being those unreactive to other components of the reaction mixture as specified hereinbefore). Where nitrogen replaces a carbon atom in the ring at X, the nitrogen atom must be substituted with a group, such as an alkyl group, unreactive to the reactants or reaction products. One of the inherent properties of compound Q is that the oxygen is available for electron donation, i.e., the free p-electrons present on the oxygen are available for coordination with the vinylic magnesium chloride. Any large blocking groups on the carbon atoms adjacent to the ring oxygen may impair the availability of these electrons and the reactivity of the compound for forming a complex and assisting in the reaction. In addition to the compounds listed hereinabove as being suitable for compound Q, other compounds satisfying the requirements for this complexing agent and solvent will be apparent to those skilled in the art from the teachings of the present invention, and are intended to be considered as equivalents. Since compound Q also apparently functions as a solvent, a compound Q which has a high melting point may still function in this invention, but if it is used as solvent, obviously the high melting point (e.g., above 90° C.) causes greater difficulty in carrying out the reaction.

The product produced by the process of this invention may be described as a complex of Q and a vinylic magnesium chloride. The vinylic magnesium chloride may be described by the following general formula:

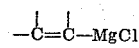

in which the free bonds on the carbon atoms may be connected to hydrogen atoms, in which case the compound is vinyl magnesium chloride, or they may have other substituents on them. Among the preferred products of the invention are those described by the general formula:

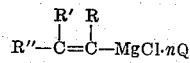

wherein R may be chlorine or fluorine and any other element or group not reactive with any of the reactants or reaction products and include hydrogen and substituted and unsubstituted aliphatic radicals (including vinylic and allylic radicals), cycloaliphatic radicals, aliphatic and aromatic oxy radicals (e.g., alkoxy radicals, aryloxy radicals, allyloxy radicals, etc.), organosilyl radicals (e.g., triarylsilyl radicals, organostannyl radicals (e.g., trialkylstannyl radicals), and organomercapto radicals (e.g., alkylthio radicals); R' and R" may be the same or different and may be hydrogen and substituted and unsubstituted aliphatic radicals (including vinylic and allylic radicals), cycloaliphatic radicals, organosilyl radicals. (e.g., triarylsilyl radicals); and organostannyl radicals (e.g. trialkylstannyl radicals); where two or more carbon groups may be linked or condensed to form a cyclic ring (e.g., cyclohexen-1-yl-1 magnesium chloride complex). R, R' or R" may not be substituted by functional groups or elements reactive to any of the reactants or reaction products and $n$ is an indeterminate small number of at least 1.

The length and size of the R, R' and R" groups are not critical, since by definition, the groups are not reactive with the reactants or reaction products under process conditions. However, with presently available materials it is not contemplated that hydrocarbon chains having more than 30 carbon atoms would be utilized as substituting groups.

Among the vinylic magnesium chloride complexes forming the product of this invention are magnesium chloride complexes of the following: vinyl, 1-propenyl, 1-pentenyl, and so forth.

Typical of vinylic chlorides which may be used in the practice of this invention are 1,1 dichloro-1-propene, 1 chloro-1-propene, 2 chloro-1-propene, 3 chloropentene-2,1 (or 2) chloropentene-1,α (or β) chlorostyrene, 1 chloro isobutene-1, 2 methyl-3-chlorobutene-2, 1-chloro-2-methyl cyclohexene, 1-chlorocyclohexene, 1-chlorobutadiene1,3; p-methoxy α chlorostyrene, p-methoxy β chlorostyrene, etc.

These chlorides react with magnesium under the conditions of the present invention to form a complex of compound Q and a vinylic magnesium chloride. Desirably, the vinylic chlorides employed have the structure:

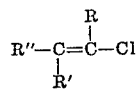

and are reacted with magnesium in the presence of compound Q. R, R' and R" have the value assigned hereinabove. The compound Q has been defined hereinabove.

In accordance with the present invention, the novel vinylic magnesium compounds are prepared by dissolving the vinylic chloride in the compound Q and admixing with the magnesium. However, where the vinylic chloride reactant is a gas, such as vinyl chloride, a suspension is made of the magnesium in the compound Q solvent, and the vinylic chloride reactant is bubbled into said suspension underneath the surface of said liquid solvent. Another method of preparing the complex comprises dissolving a small amount of the vinylic chloride in compound Q, reacting this mixture with magnesium (initiating if necessary) and after the reaction commences, slowly adding the remainder of the vinylic chloride. A further method comprises dissolving the vinylic chloride in some of the compound Q and adding the resulting solution to a reaction mixture containing the remainder of compound Q, the magnesium and any initiator. Excess amounts of compound Q (more than the theoretical 2 (or 1) moles required for complexing) are usually utilized in the process. This excess acts as a solvent. However, such excess amounts need not be used. Another variation would consist in using an inert hydrocarbon as a diluent. However, for some reactants, initiation of the reaction is required and may be accomplished by suitable means, such as the addition of a small amount of ethyl bromide (and ether), an iodine crystal, etc. In many cases an exothermic reaction proceeds immediately. In some cases it is necessary to heat at reflux to obtain a reaction. At atmospheric pressure, the optimum temperature necessary to obtain the desired reaction is about 50° C., although a temperature range of 20–100° C. may be utilized. Lower temperatures require more time and higher temperatures less time to complete the reaction. The reaction mixture is preferably agitated during the course of the reaction and an inert atmosphere, e.g., nitrogen which is cheapest, is preferably maintained. In the event the vinylic chloride is a gas, such as vinyl chloride and the like, elevated pressures may be desirable in order to keep the gaseous reactant dissolved in the solvent. Yields obtained vary with the particular vinylic chloride being reacted and frequently approach 100%.

Using the compound Q as the reaction medium, the vinylic magnesium chloride complexes formed are believed to contain at least one molecule of Q for each molecule of vinylic magnesium chloride produced. Where the vinylic magnesium chloride is produced in a reaction medium containing more than equal molecular amounts of Q, the number of molecules in the complex may be in excess of one. The maximum number of molecules of Q which may be present in the complex is difficult to ascertain. When the maximum is exceeded, Q is present as a solvent for the complex. Where more than one molecule of Q is present in the complex, e.g., 3 molecules, it is possible to distill off the molecules in excess of one by adding a high-boiling, inert solvent, such as toluene, xylene, cumene or kerosene, and distilling. The last molecule of Q is bound to the complex quite tenaciously and is not removed readily. It is believed that the compound Q is complexed to the vinylic magnesium chloride in small whole numbers, i.e., 1, 2 or 3 molecules, and not in intermediate numbers. However, since the reaction product may exist in mixtures of complexes having different numbers of molecules of Q, it is possible that the average number of molecules of Q for each molecule of vinylic magnesium chloride may not be a whole number, i.e., 1.5. The precise manner in which the compound Q is complexed is not entirely known. It is presumably complexed as ViMgCl·Q, but since Grignard reagents are also considered to exist according to the equilibrium:

it is conceivable that the complex of Q may exist as:

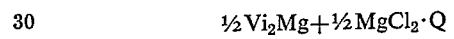

rather than as:

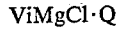

Consequently, when referring to the complex of the invention, it is intended to encompass whichever form may actually exist. "Vi" refers to vinylic.

The following examples illustrate ways in which the principle of the invention can be employed, but they are not to be construed as limiting the invention.

*Example 1.—Preparation of vinyl magnesium chloride·tetrahydrofuran complex.*—About 4 ml. of ethyl bromide and two small iodine crystals were added to a mixture of one gram atom of magnesium turnings in 300 ml. of tetrahydrofuran in order to activate the magnesium. Vinyl chloride was bubbled under the liquid surface and the reaction mass was stirred. The temperature rose to about 52° C. and additional heat was applied to bring the reaction mixture to a reflux temperature of about 63° C. The temperature was subsequently dropped to about 50–52° C. in order to obtain solution of more vinyl chloride in the tetrahydrofuran solvent. The reaction became exothermic in nature and maintained its temperature without external heating. After substantially all the magnesium was dissolved, the reaction mass was cooled and diluted with sufficient tetrahydrofuran to make up a total volume of 1000 ml. Aliquot portions thereof were titrated by Gilman's method to determine the yield of vinyl magnesium chloride·tetrahydrofuran complex. This yield was 98.5%.

On subsequent runs the yields were 97.6% and 100%.

*Example 2.*—About 1 mole (111 grams) of 1,1 dichloro-1-propene was mixed with 3 moles (216 grams) of tetrahydrofuran. 1 gram atom (24.3 grams) of magnesium and a small crystal of iodine were placed in a 3 neck, one liter flask equipped with a stainless steel anchor stirrer. The air was flushed out of the flask by dry nitrogen. Then 20 ml. of the mixture of tetrahydrofuran and the dichloropropene was added; this was followed by 2 ml. of ethyl bromide. An exothermic reaction began immediately, the temperature rising to 68° C. The mixture was added slowly at such a rate that steady refluxing was maintained. This took about 100 minutes. The flask was stirred for another hour, heat being supplied to keep the reaction mass warm. Then the product was diluted to 1000 ml. with tetrahydrofuran and aliquot samples were analyzed for Grignard reagent by a modified Gilman titration. The yield of Grignard reagent was found to be about 27% of theoretical.

The following standard experimental procedure was used in the following examples. Where the experimental conditions deviated from the standard procedure, it is noted in the description of the experiment.

One gram atom (24.3 grams) of magnesium turnings were charged into a 1,000 ml. 3 neck flask which was then purged with nitrogen. In another flask, a mixture consisting of 1 mole of the vinylic chloride utilized was dissolved in 216.0 grams (3 moles) of tetrahydrofuran. Ten ml. of this mixture was then added to the charge in the 3 neck flask and the reaction was initiated by addition of 2 ml. of ethyl bromide and the addition of a small iodine crystal. After initiation of the reaction, the remainder of the vinylic chloride/tetrahydrofuran mix was slowly added to the 3 neck flask, with constant stirring. The formation of the vinylic magnesium chlorides is usually exothermic. When necessary, external heat was applied to the flask to keep the reaction going at reflux and/or to carry it to completion. At the completion of the reaction, the product was titrated in a standard Gilman test to determine the yield of vinylic magnesium chloride.

*Example 3.—2-propenyl magnesium chloride complex.*—One mole (76.5 grams) of 2-chloropropene were dissolved in tetrahydrofuran. The reaction started at 41° C. and attained a maximum temperature of 61° C. The reaction was completed in 30 hours. The yield of 2-propenyl magnesium chloride·tetrahydrofuran complex was 25%.

*Example 4.—1-propenyl magnesium chloride complex.*—One mole (76.5 grams) of 1-chloro-1-propene were dissolved in tetrahydrofuran. The reaction started at 39° C. and attained a maximum temperature of about 58° C. The reaction was completed in 23 hours. The yield of 1-propenyl magnesium chloride·tetrahydrofuran complex was 9.3%.

*Example 5.—4-methyl-2-penten-2-yl magnesium chloride complex.*—One-half mole (12.2 grams) of magnesium were charged into a 500 ml. flask. One-half mole (59.3 grams) of 2-chloro-4-methyl-2-pentene were dissolved in 108.0 grams (1.5 moles) of tetrahydrofuran. The reaction started at 64° C. and attained a maximum temperature of 83° C. The reaction was completed in 5 hours and 25 minutes. The yield of 4-methyl-2-penten-2-yl magnesium chloride·tetrahydrofuran complex was 87.8%.

*Example 6.—2-buten-2-yl magnesium chloride complex.*—One-half g. atom (12.2 grams) of magnesium were charged into a 500 ml. flask. One-half mole (45.3 grams) of 2-chloro-2-butene were dissolved in 108.0 grams (1.5 moles) of tetrahydrofuran. The reaction started at 62° C. and attained a maximum temperature of 68° C. The reaction was completed in 9 hours and 40 minutes. The yield of 2-buten-2-yl magnesium chloride·tetrahydrofuran complex was 49.7%.

*Example 7.—1-buten-1-yl magnesium chloride complex.*—Forty and six-tenths (40.6) grams (0.448 mole) of 1-chloro-1-butene were dissolved in 96.8 grams (1.344 moles) of tetrahydrofuran. Eleven and six-tenths (11.6) grams (0.448 g. atom) of magnesium turnings were used. The reaction started at 49° C. and was maintained at about 67° C. with external heating. The reaction was continued for 23½ hours. The yield of 1-buten-1-yl magnesium chloride·tetrahydrofuran complex was 15.1%, as titrated and as determined by the amount of magnesium consumed, 25.8%.

*Example 8.—1-cyclohexen-1-yl magnesium chloride complex.*—One-half mole (58.3 grams) of 1-chlorocyclohexene-1 were dissolved in 108 grams (1.5 moles) of tetrahydrofuran. One-half g. atom (12.2 grams) of magnesium turnings were used. The reaction started at 42° C. and attained a maximum temperature of 76° C. (with external heating). The reaction continued for 15 hours and 10 minutes. The yield of 1-cyclohexen-1-yl magnesium chloride·tetrahydrofuran complex, as titrated was 19.2%; and as determined by the amount of magnesium consumed, 28.7%.

*Example 9.—Vinyl magnesium chloride complex.*—Three moles (187.5 grams) of vinyl chloride were dissolved in 10½ moles of tetrahydrofuran. Two and one-half g. atoms of magnesium were used. The magnesium and approximately 25 ml. of the vinyl chloride/tetrahydrofuran solution were added to a flask. The reaction was initiated with 2.5 ml. of ethyl bromide. The reaction was then maintained at a temperature between 50° C. and 60° C. while the solution was slowly added over a period of 6 hours. The entire reaction time was 8 hours. The yield of vinyl magnesium chloride·tetrahydrofuran complex was 88.4%.

*Example 10.*—Twenty ml. of a mix of one mole of beta-chlorostyrene in 3 moles of tetrahydropyran was added to 1 g. atom of magnesium; then 2 ml. of ethyl bromide was added. The reaction flask was heated to slow reflux and the remainder of the mix was added over a period of 1½ hours. Refluxing was maintained for 1 hour longer and after cooling, the mix was diluted to 1 liter with tetrahydropyran and titrated to determine the yield of beta-phenylvinyl magnesium chloride·tetrahydropyran complex.

*Example 11.*—By the process of Example 8, alpha-chlorostyrene in 2-methyltetrahydrofuran yields alpha-phenylvinyl magnesium chloride·2-methyltetrahydrofuran complex.

*Example 12.*—By the process of Example 8, beta-chloro-alpha-methylstyrene in tetrahydrofurfuryl ethyl ether yields alpha-methyl-beta-phenylvinylmagnesium chloride·tetrahydrofurfuryl ethyl ether complex. The reaction is kept at 65–70° C. instead of at reflux.

*Example 13.*—By the process of Example 8, 2-chloro-octadecene-1 in 2-ethoxytetrahydropyran yields octadecen-1-yl-2-magnesium chloride·2-ethoxytetrahydropyran complex. This reaction is kept at a temperature of 65–70° C.

*Example 14.*—By the process of Example 8, 1 chloro-1-octadecene in dihydropyran yields 1-octadecen-1-ylmagnesium chloride·dihydropyran complex. The reaction is kept at 65–70° C.

*Example 15.—Vinyl magnesium chloride complex.*—Twenty ml. of a mix of 1 mole of vinyl chloride in 3 moles (237 grams) of N-methylmorpholine was added to 1 gram atom of magnesium and the reaction initiated. The reaction flask is heated to slow reflux and the remainder of the mixture was added over a period of 1½ hours. Refluxing was maintained for 1 hour longer, and after cooling the mixture was diluted and titrated to determine the yield of vinyl magnesium chloride·N-methylmorpholine complex.

As will be apparent to those skilled in the art, other reaction solvents within the scope contemplated for compound "Q" may be employed in the foregoing examples in place of those used.

The vinylic magnesium chloride complexes of this invention are useful as chemical intermediates in the preparation of organic compounds.

The vinylic magnesium chlorides are useful as ester interchange catalysts in preparing polyesters by condensing diesters of a dicarboxylic acid and polyhydroxy compounds. The polyesters so formed are used to spin valuable fibers. The present vinylic magnesium chlorides are also useful as Ziegler condensation catalysts for the polymerization of ethylene to form polyethylenes. The latter, in film or sheet form, are widely used in the packaging industry.

As noted above the vinylic magnesium chloride complexes of this invention are very useful "tools" to the organic chemist in that they may be used to prepare many compounds, a good number of which are old and have been used for a time.

Various reactions wherein the present vinylic magnesium chloride complexes may be used are presented in the equations below:

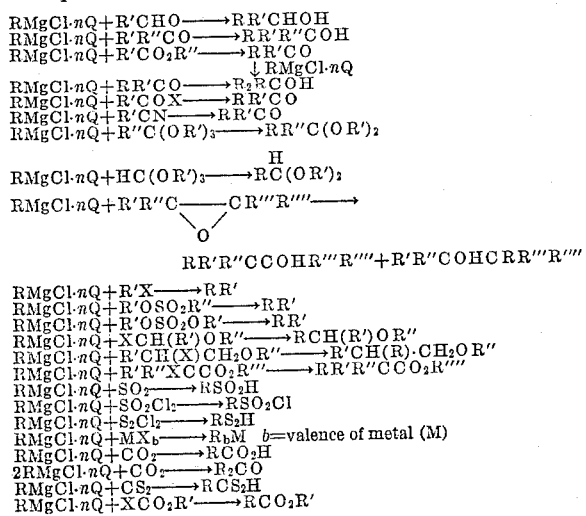

In these equations R is a vinylic radical as defined above and R', R'', R''' and R'''' are hydrocarbon radicals, e.g., aliphatic, cycloaliphatic, aromatic, or heterocyclic, X is fluorine, chlorine, bromine, or iodine, M is a metal or metalloid from one of the following groups of the periodic table: I$b$, II$b$, III, IV, V, VI, VII and VIII, $n$ is a small number and at least one, and Q has the value ascribed to it above.

Of the many compounds having wide utility that may be made using the present Grignard reagents may be mentioned acrylic acid which is made from the reaction of the vinyl magnesium chloride · tetrahydrofuran complex of Example 1 with $CO_2$. Acrylic acid is useful in its polymerized form as a water soluble thickening agent, a constituent for varnishes and lacquers and as a binder for paste. Tetravinyl silane, made by the reaction of the Grignard reagent of Example 1 and $SiCl_4$, is useful as a copolymer constituent in copolymers of styrene and tetravinyl silane. These copolymers are valuable as ingredients in coating compositions.

While the invention has been described with particular reference to specific embodiments, it is to be understood that it is not limited thereto but is to be construed broadly and restricted solely by the scope of the appended claims.

What is claimed is:

1. A process for producing a solution of a complex of vinylic magnesium chloride and a cyclic ether which comprises reacting a vinylic chloride having up to 24 carbon atoms and at least an equimolecular amount of a cyclic ether with magnesium, said cyclic ether having between 5 and 6 whole members, inclusive, in the ring with at least one hydrogen atom attached to each carbon atom in the ring, and having the formula:

wherein X is a member selected from the class consisting of methylene and the group =NR'', wherein R'' is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR'', the ring shall contain 6 members and X and O shall be in a position 1:4 with respect to each other.

2. A process according to claim 1 wherein the molecular amount of cyclic ether is in excess of a 1:1 ratio to the molecular amount of vinylic chloride.

3. A process according to claim 1 wherein the molecular amount of cyclic ether is in about 3:1 ratio to the molecular amount of vinylic chloride.

4. A process according to claim 1 wherein the cyclic ether is 2-methyltetrahydrofuran.

5. A process according to claim 1 wherein the cyclic ether is dihydropyran.

6. A process according to claim 1 wherein the cyclic ether is tetrahydrofurfuryl ethyl ether.

7. A process according to claim 1 wherein the cyclic ether is tetrahydrofuran.

8. A process according to claim 7 wherein the vinylic chloride is vinyl chloride.

9. A process according to claim 7 wherein the vinylic chloride is butenyl chloride.

10. A process according to claim 7 wherein the vinylic chloride is β-styryl chloride.

11. A process according to claim 7 wherein the vinylic chloride is 1-cyclohexenyl chloride.

12. A process according to claim 7 wherein the vinylic chloride is 2-chloro-1-propenyl chloride.

13. A solution of a complex of a vinylic magnesium chloride having up to 24 carbon atoms and at least an equimolecular amount of a cyclic ether; said cyclic ether having between 5 and 6 whole member, inclusive, in the ring with at least one hydrogen atom attached to each carbon atom in the ring, and having the formula:

wherein X is a member selected from the class consisting of methylene and the group =NR'', wherein R'' is an alkyl group, R is an unsubstituted alkylene radical, R' is a member selected from the class consisting of an ethylene radical, an ethylenically unsaturated divalent hydrocarbon radical and the group =CHR''', wherein R''' is a member selected from the class consisting of hydrogen, alkyl and alkoxy radicals, and O is oxygen; when X is the group =NR'', the ring shall contain 6 members and X and O shall be in a position 1:4 with respect to each other; said complex being dissolved in said cyclic ether.

14. The composition of claim 13 wherein the cyclic ether is tetrahydrofuran and the vinylic chloride is vinyl chloride.

15. The composition of claim 13 wherein the cyclic ether is tetrahydrofuran and the vinylic chloride is butenyl chloride.

16. The composition of claim 13 wherein the cyclic ether is tetrahydrofuran and the vinylic chloride is β-styryl chloride.

17. The composition of claim 13 wherein the cyclic ether is tetrahydrofuran and the vinylic chloride is 1-cyclohexenyl chloride.

18. The composition of claim 13 wherein the cyclic ether is tetrahydrofuran and the vinylic chloride is 2-chloro-1-propenyl chloride.

References Cited in the file of this patent

FOREIGN PATENTS 777,158     Great Britain _____ June 19, 1957

OTHER REFERENCES

Normant: Compte Rend., vol. 239, 1954, pages 510–512.